Sept. 27, 1955  A. S. PEARSON  2,719,030
CONTINUOUS VEGETABLE MIXER AND BREAKER
Filed April 7, 1953  5 Sheets-Sheet 1

INVENTOR
ALEXANDER S. PEARSON

BY *Semmes & Semmes*
ATTORNEYS

Sept. 27, 1955  A. S. PEARSON  2,719,030
CONTINUOUS VEGETABLE MIXER AND BREAKER
Filed April 7, 1953  5 Sheets-Sheet 3

INVENTOR
ALEXANDER S. PEARSON
BY
Semmes + Semmes
ATTORNEYS

INVENTOR
ALEXANDER S. PEARSON

Sept. 27, 1955  A. S. PEARSON  2,719,030
CONTINUOUS VEGETABLE MIXER AND BREAKER
Filed April 7, 1953  5 Sheets-Sheet 5

INVENTOR
ALEXANDER S. PEARSON

BY *Semmes & Semmes*
ATTORNEYS

United States Patent Office
2,719,030
Patented Sept. 27, 1955

2,719,030

CONTINUOUS VEGETABLE MIXER AND BREAKER

Alexander S. Pearson, Exmore, Va., assignor to John H. Dulany & Son, Inc., Fruitland, Md., a corporation of Maryland Application April 7, 1953, Serial No. 347,369

6 Claims. (Cl. 259—10)

This invention broadly relates to a new and useful machine for rapid and accurate metering and mixing of various products. More specifically the invention relates to a machine adapted for measuring and mixing of frozen vegetables which is extremely rapid and accurate in operation.

For many years there has been a necessity for a machine which will rapidly and positively meter and mix various ingredients and this need has been prevalent in many fields. There has been a continuing desire in past years in the frozen food industry to mix individual frozen commodities so as to provide a packageable mixture of the individual ingredients. A continuous means of metering and mixing such commodities however furnished problems which heretofore could not be solved. There has not to this time been provided a practical means for mixing of individual prefrozen foods despite ingenuity which has been exercised in the field of industry in general.

It has also been a problem in the food preparation industry to provide a mixer which is an effective and efficient means of preparing frozen food mixtures including the breaking apart of individual frozen vegetables properly, accurately and rapidly.

A further difficulty encountered in the food field was the inability to provide a plurality of segregated individual foods together with means for maintaining an adequate supply of the same and thereafter properly and efficiently mixing the segregated foods by a common mixing means.

Another problem existing in machines for breaking and mixing of frozen vegetables was the requirement for high sanitation conditions necessitating accessibility for inspection, cleaning, and simplicity of construction whereby parts can be easily and conveniently assembled or dismantled for cleaning and repairs.

An object of the present invention is to provide a machine which solves the problems of the industry in mixing frozen foods and which is also applicable to other industries.

A further object of the invention is to provide such a machine which overcomes all drawbacks and inconveniences of previously known machines.

Another object of the invention is to provide a machine capable of continuous metering and mixing of individual frozen commodities which is an effective and efficient means of preparing frozen food mixtures.

Another object of the invention is to provide such a machine having accessibility for inspection and cleaning, and which maintains the highest sanitary conditions.

Still another object of the invention is to provide a machine having simplicity of construction and wherein any part may be conveniently and easily assembled or dismantled so that repairs and cleaning are readily effected.

Still another object of the invention is to provide a machine which will enable an average workman to perform mixing of various products without requiring weighing or bulking heretofore prevalent in the industry and which is capable of continuous high speed operation.

A further object of the invention is to provide a machine in which the quantity of individual ingredients to be placed in the final mix are effected and changed by speed change means for individual metering devices for the individual materials. In the machine of the invention, the ingredients are volumetrically measured thereby eliminating any necessity for delicate scale beams or electronic devices and the overall output of the machine can be changed as desired while maintaining the desired proportions of individual ingredients by a speed control means.

Still another object of the invention is to provide a machine in which the combination of products or ingredients can be readily, quickly and easily changed.

Still another object of the invention is to provide in a machine of this nature a breaker assembly for parting of the individual vegetables, which have been frozen in mass form due to the moisture content existing during freezing, and which breaker mechanism positively insures against breaking up of the individual vegetables.

Another object of the invention is to provide a machine having separate individual bins for individual foods which are metered and delivered to a common mixing means and, thereafter, delivered for packaging as desired. A breaker assembly for such a machine is, of necessity, movable from one metering device to another so as to maintain a sufficient supply of the individual commodities in the individual bins.

In attaining the objects of the invention, the metering and mixing apparatus comprises a line of separate hoppers for different kinds of frozen vegetables, each hopper having an outlet at its bottom through which the material feeds into a feed screw and the feed screws of all the individual hoppers deliver the material into a common mixing and conveying screw. The common mixing and conveying screw then mixes together the vegetables received from the different hoppers and conveys them for further handling. Each of the screws leading from the individual hoppers to the common mixing screw serve as metering screws and determine the rate of delivery of the food as well as measuring the food volumetrically. The mixing and delivery rate of the common mixing screw is also adjustable for coordination with the individual feed screws.

The vegetable breaker utilized for separating the individual vegetable particles from a frozen mass is mounted to travel along over the tops of the individual hoppers and to break up frozen clusters of food before the food is dropped into the hopper. This breaker includes a rotating drum having two rows of spiral fingers which pass between stationary fingers with sufficient clearance therebetween so as to prevent damage to the vegetables themselves. Additionally there is provided a movable grate which is liftable to cause frozen clusters of vegetables to be moved into engagement with the breaker fingers.

The broad aspect and objects of the invention exist then in a combination of metering and mixing apparatus with material-breaking mechanism movable over a plurality of hoppers of metering and mixing apparatus and means for moving material into engagement with breaking and separating means.

Other objects and advantages of the present invention will be apparent from the following detailed description of an embodiment of the invention taken together with the accompanying drawings, in which:

Figure 9 is a diagrammatic view of the drive means for the metering and mixing screws.

Figure 1:
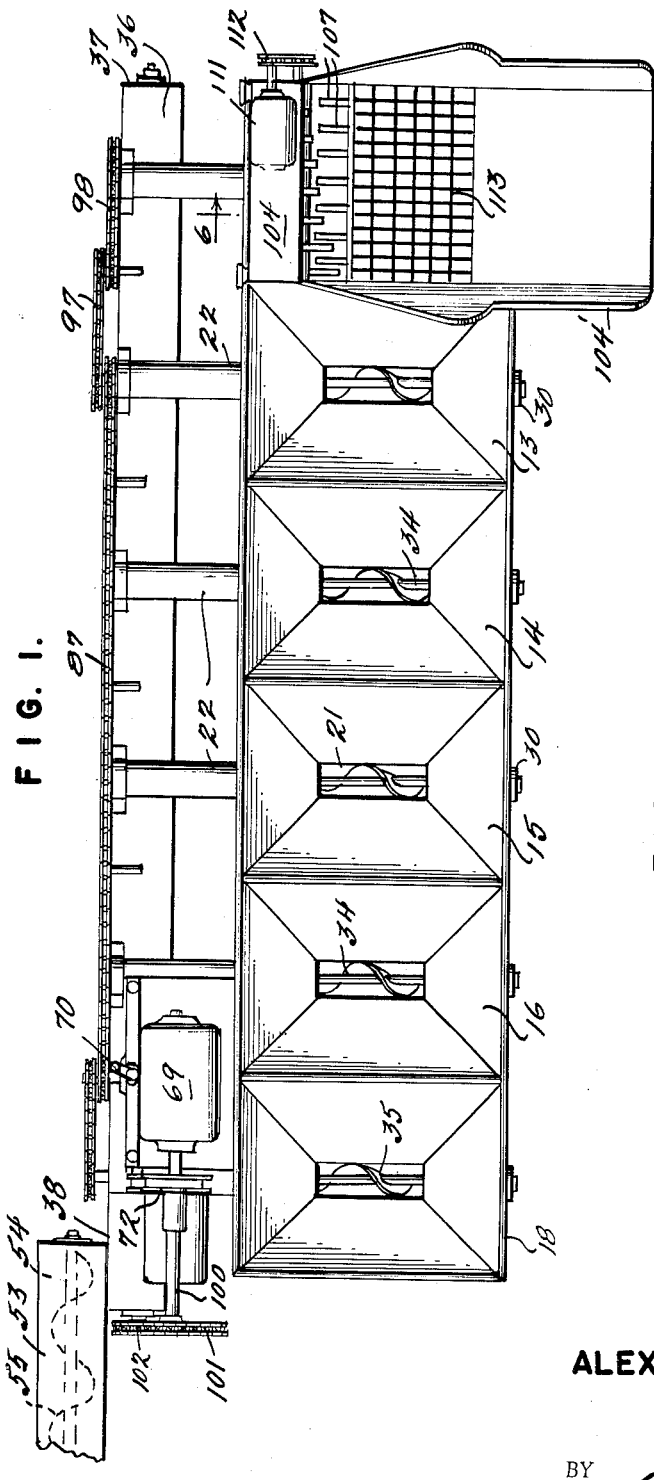
Figure 1 is a top plan view of the machine of the present invention.
Figure 2:
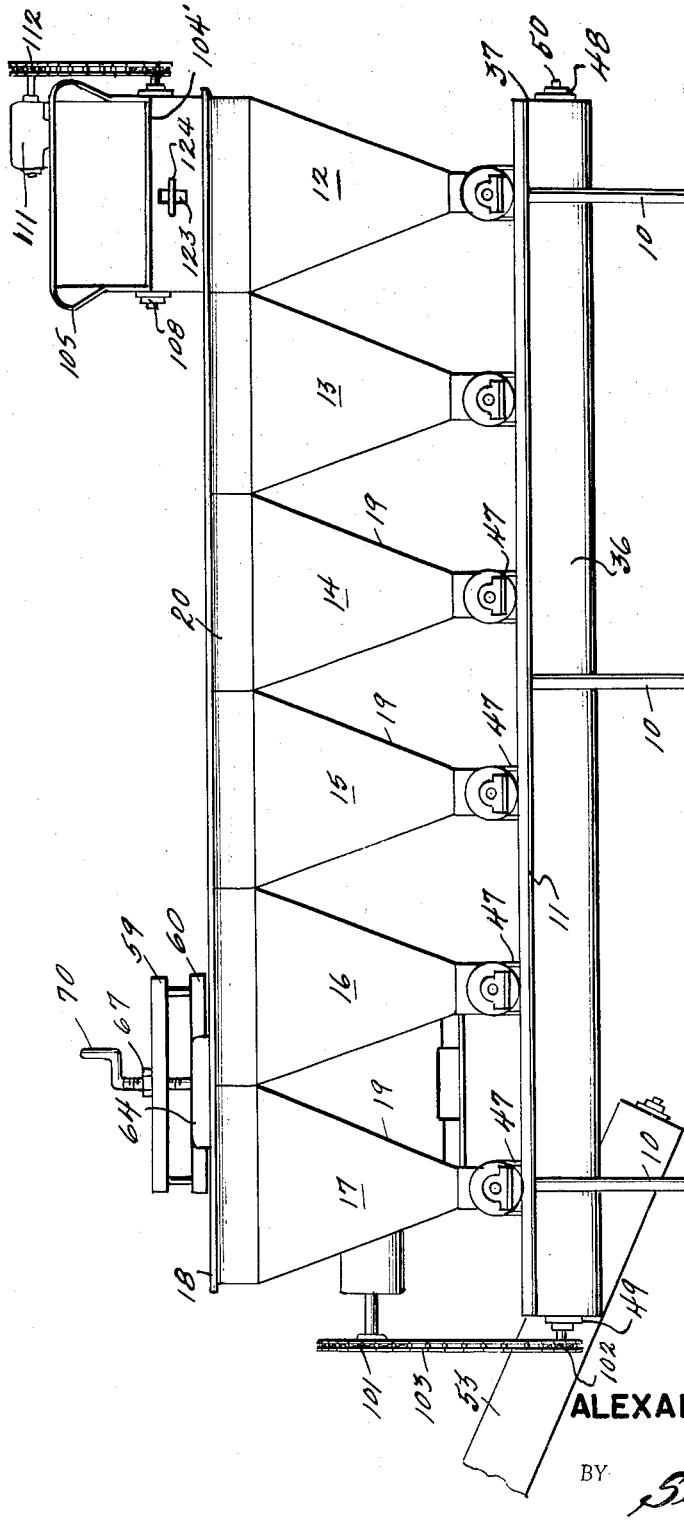
Figure 2 is a side elevational view of the machine of Figure 1.

The machine of the present invention can be supported above a floor in any known manner. In the drawings there have been shown upright bars 10 and longitudinally extending bars or stringers 11 supported thereon and properly welded for rigidity and strength. If necessary or desirable, transversely extending bars, plates or beams can be used between the longitudinal bars 11 for added rigidity, but as will be pointed out hereinafter this is not necessary since a portion of the machine is secured to the longitudinal bars 11.

A plurality of separate hoppers or bins are provided so that individual separate commodities can be placed therein for later mixing. These hoppers are designated generally as 12, 13, 14, 15, 16, and 17. Manifestly any desired number of these hoppers can be used depending upon the number of individual commodities it is desired to mix. It is also to be understood that it is not necessary to utilize all of the individual hoppers at any given time. One standard mixture now being produced to furnish mixed vegetables consists in carrots, corn, peas, lima beans, snap beans and peppers. Since there are six individual products, there are six hoppers provided as shown in the drawings. The hoppers 12–17 are preferably formed in a group having a substantially continuous upper end on each longitudinal side of the group. If desired this upper edge could be formed as a separate bar. The upper edge or bar 18 should have a curved or circular shape for purposes hereinafter set forth.

The individual hoppers, as seen in Figure 1 of the drawings, have sloped converging walls 19 for feeding the material placed therein to the bottom. The shape of the individual hoppers can of course assume any suitable shape provided that the convergence and sloping nature of the walls is maintained. The shape which can be used includes any inverted funnel-shape or more specifically an inverted truncated cone. The shape of the hoppers as shown in the drawings is substantially that of a truncated pyramid shape. In the form shown in the drawings, between the sloping walls 19 and the upper edge 18, there are upstanding side walls 20 which mate with contiguous hoppers and form an upstanding rim around the group of hoppers. Both the upper and lower ends of the individual hoppers are open. The bottom opening in the drawings is shown in the shape of an elongated or rectangular slot.

Placed under each of the individual hoppers is a tubular casing 22 which is supported by the longitudinal bars 11, welded or secured thereto in any desired manner. These tubular casings are interposed between the bars 11 and the individual hoppers 12–17. The individual hoppers are accordingly supported by the individual tubular casings 22, as better shown in Figure 5. Each of the tubular casings 22 has an elongated opening 23 therein of a size corresponding to the opening 21 in the hoppers. The hoppers and the tubular casings are interconnected by upstanding walls forming box-like configurations 24. Each of the hoppers 12–17 accordingly opens into a separate tubular casing 22 at the bottom end thereof.

Figure 5:
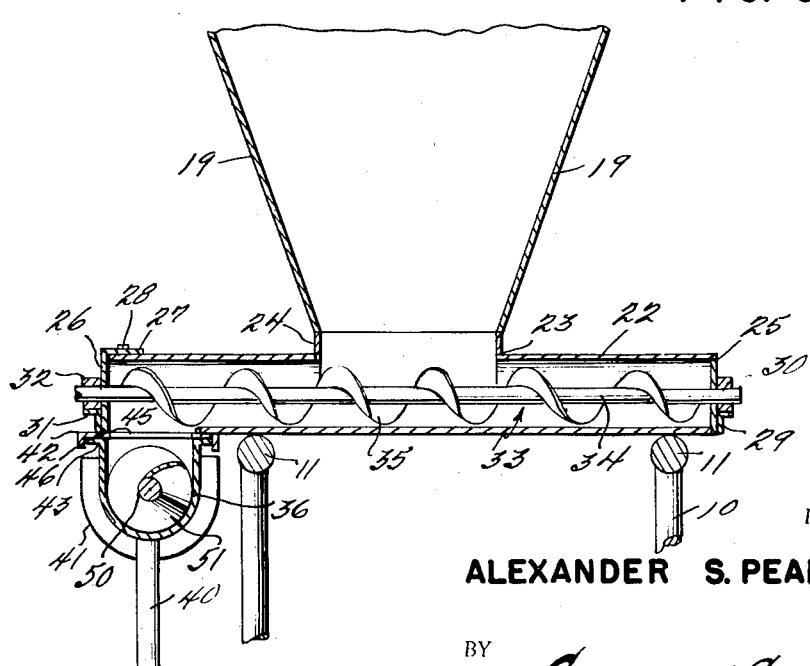
Figure 5 is a fragmentary sectional view of an individual hopper and metering means for feeding to the mixing device.

The tubular casings 22 are closed at each end by means of a plate 25 on the rear of the machine which can be either removably attached or fixed thereto as by welding, and a plate 26 on the front end which is removably secured by means of a cap 27 and a bolt or screw 28 of any desired nature. The cap 25 has an angle iron 29 secured thereto which supports a bearing 30. The plate 26 rests on a mixing screw chamber which will be specifically referred to hereinafter and has an angle iron 31 which supports a bearing 32. The bearings 30 and 32 are preferably in the nature of pillow blocks although any desired type of bearing can be used. The end plates 25 and 26 as shown in Figure 5 have openings therethrough. Rotatably journaled in each of the tubular casings 22, there is a metering and feeding screw conveyor 33 having a shaft 34 and a continuous spiral screw 35 of a standard type construction. The ends of shaft 34 extend through the openings in the end plates and are journaled in the bearings 30 and 32. Drive means are provided for each of the screws in each of the tubular casings as will appear hereinafter.

Extending longitudinally of the entire group of hoppers, is a mixing or blending chamber 36 preferably of trough-shape and having a forward end closed as shown at 37 by an end plate, the opposite end 38 of which extends beyond the group of hoppers for connecting into a filler-conveyor 53 which is only partially and diagrammatically shown in the drawings for simplicity. The chamber 36 is supported by means of bars 40 having flanges 41 welded thereto and of trough-shaped configuration to mate with the chamber 36. The open upper end of chamber 36 is closed by a cover 42 having overturned edges for coacting with the flanges 43 on the trough. Sections of the cover 42 can be made removable for inspection, cleaning and repair. This cover can be fastened by any desired means such as a wing nut 44 which can coact with a bolt on the flange 43. Each tubular casing 22, at the point superimposed over the mixing chamber 36, has an elongated opening or slot 45. The cover 42 for the chamber 36, at these points, is provided with corresponding openings 46. The openings 45 and 46 are interconnected with one another by means of side plates 47.

Figure 4:
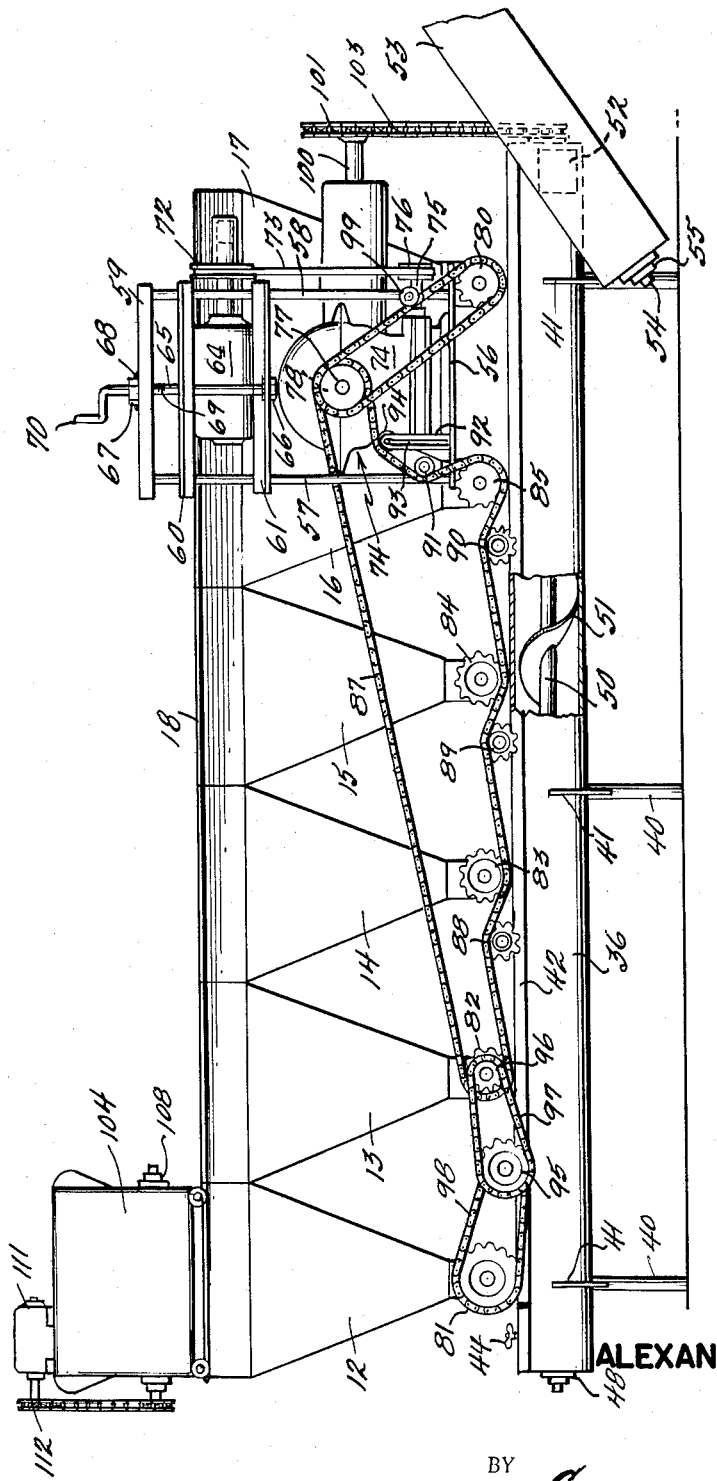
Figure 4 is a rear elevational view of the machine.

The blending chamber 36 has, rotatably channeled therein by means of bearings 48 and 49, a shaft 50 on which is mounted a continuous spiral screw thread 51 as shown in Figures 4 and 5. This shaft and thread 50, and 51 constitute a blending or mixing screw which takes the material from the individual hoppers through the openings 45, 46, and conveys it to a discharge outlet 52 in the side of the chamber 36. Drive means are provided for the screw conveyor in the mixing chamber as will be set forth hereinafter.

A delivery or filler chute 53 is in contact with chamber 36 and takes the material from opening 52. Rotatably channeled in the filler chute 53 is a standard screw conveyor having a shaft 54 rotatably journalled in bearing 55. The conveyor screw is shown at 55.

The drive means for the various conveyor and metering screws will now be explained in detail. A plate 56 is mounted on top of two adjacent tubular casings 22, adjacent the discharge end of the machine as shown in Figure 4. This plate is preferably welded to the tubular casings for rigidity and security. Extending upwardly from the plate 56 are standards 57 and 58 secured on the plate by welding or any other desired manner. An angle iron 59 extends across the tops of standards 57 and 58 and is secured thereto. Slidably mounted on the standards 57 and 58, are two additional angle irons 60 and 61 having brackets 62 and 63 secured thereto at right angles to the members 57 and 58. These brackets 62 and 63, support the main drive motor 64 for driving the metering and mixing screws. Each of the angle irons 59, 60 and 61 have holes therethrough. A shaft 65 extends through these holes and is rotatably mounted by means of bushing 66 on the angle iron 61. A threaded nut 67 is secured on the top angle iron 59 by welding, or the like at 68. The shaft 65 extends through this nut and has a threaded portion 69 for coacting with the nut 67. The upper end of the shaft 65 is formed as a crank handle 70. This arrangement permits upward or downward movement of the two angle irons 60 and 61, together with the brackets and the motor 64. The motor shaft 71 has journaled thereon a variable speed sheath, shown at 72, the operation of which is well known and will not be set forth in detail herein. By rotation of the crank 70 the angle irons 60, 61 and the motor 64 together with the variable speed sheath 72 can be raised or lowered so that the belt 73 trained therearound is drawn further into or removed from the space between the two plates of the sheave as regards the center of the shaft, and accordingly the speed of movement of the belt 73 can be varied.

Figure 3:
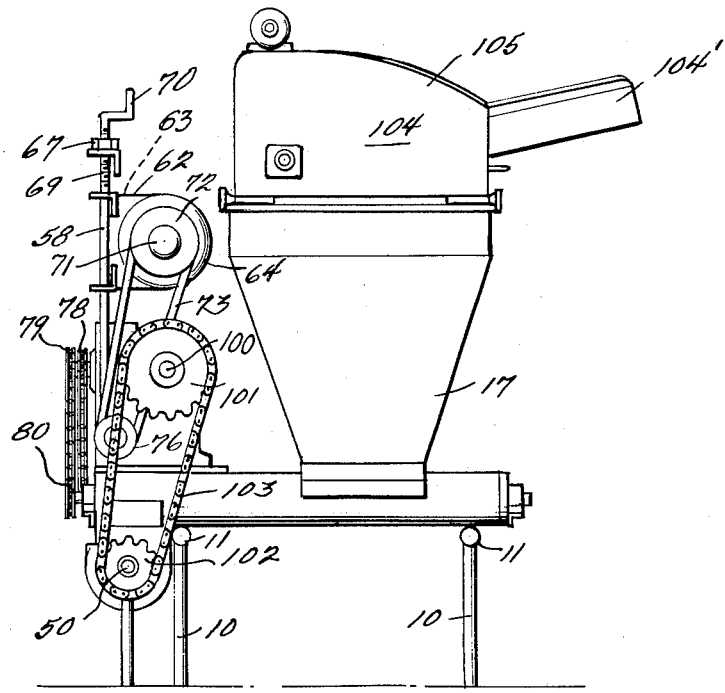
Figure 3 is an end elevational view of the device shown in Figure 2 and including details of the breaker assembly and drive means.

A reduction gear, generally designated 74, has a shaft 75 and a pulley 76 on the end thereof over which the opposite end of belt 73 is trained for driving the reduction gear from the motor 64. The reduction gear has an output shaft 77 on which are mounted two sprocket wheels 78 and 79 as seen from Figure 3. A drive chain extends from the outer sprocket wheel 79 to a sprocket wheel 80 on the end of the shaft of the first metering tubular casing below the hopper 17 for driving the conveyor 33. The shafts 34 for the metering and conveyor screws 33, below the various hoppers, each have a sprocket gear thereon. These are designated as 81 below hopper 12, 82 below hopper 13, 83 below hopper 14, 84 below hopper 15, 85 below hopper 16. A long continuous link chain is entrained over sprocket 78 and over sprocket 82. This continuous chain 87 is also entrained over sprocket gears 83, 84 and 85. Interposed between sprocket gears 82 and 83 is an idler gear 88 and interposed between sprocket gears 83 and 84 is another idler gear 89. There is also an idler gear 90 interposed between sprocket gears 84 and 85. These idler gears 88, 89 and 90 all coact with the chain 87 and provide proper tensioning and angle of approach for the various sprocket gears in question. Between sprocket gear 78 and sprocket gear 85 there is interposed an idler gear 91 mounted on the standard 57. An angle bar 92 is fastened on plate 56 and extends upwardly therefrom. This angle bar 92 has an elongated slot 93 therein. A chain tightener in the nature of an idler sprocket gear is rotatably channeled in slot 93, as shown at 94, and is slidably adjustable therein to maintain proper tension of the chain. For clarity's sake the fastening means for this sprocket gear are not shown in the drawings.

There is an additional idler wheel 95 which is mounted on the frame between the hoppers 12 and 13. A second sprocket wheel 96 is mounted on the shaft below hopper 13 which also has sprocket 82 thereon. The sprocket gear 96 is of smaller diameter than sprocket gear 82. Entrained over sprocket gears 95 and 96 is a link chain 97 for driving sprocket 95. Mounted on the same shaft as sprocket gear 95 is an additional sprocket gear of smaller diameter and over this is entrained a link chain 98 which is also trained over sprocket gear 81 for driving the metering and feeding screw below hopper 12. On standard 58 opposite idler gear 91 is a further idler gear 99 coacting with the chain over gear 80.

The foregoing described chain drive for the various metering and feeding screws below the individual hoppers is diagrammatically and operatively shown in Figure 9. From this figure the coaction of the chain with the various sprocket gears and idler gears can readily be seen.

A second output shaft from reduction gear 74 is shown at 100 and on this shaft there is a sprocket wheel 101. There is a sprocket wheel 102 on shaft 50 of the conveyor screw mounted in the mixing or blending chamber 36. A chain link drive 103 is entrained over the wheels 101 and 102 for driving the conveyor in the mixing chamber.

Figure 7:
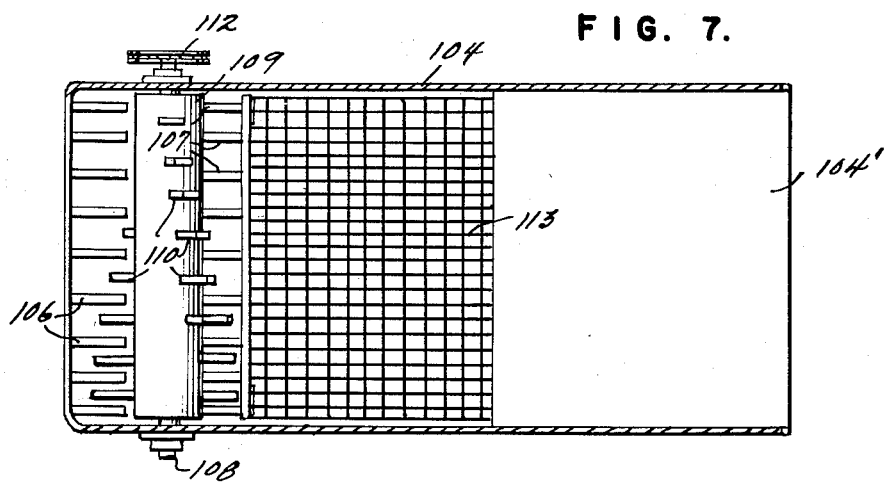
Figure 7 is a sectional view taken on the line 7—7 of Figure 6.
Figure 8:
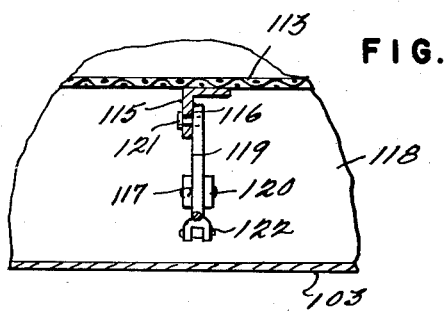
Figure 8 is a fragmentary sectional view taken on the line 8—8 of Figure 6 showing a detail of the lifting means for the feeder grate.

When frozen foods are in their initial state, prior to mixing such as contemplated by the present invention, the vegetables will ordinarily, after having been preliminarily treated and then frozen, form a solidified mass. When practicing the present invention it is necessary to break up this solidified mass into individual pieces or particles and at the same time to insure that the pieces will not be cut or sliced or broken. This is accomplished in the present invention by means of a breaker unit shown in detail in Figs. 6 to 8. The breaker unit consists in a casing 104 having an intake hopper 104' into which the mass of frozen vegetable is introduced. The sides of the casing 104 are flared at 105 to facilitate insertion of the frozen mass of vegetables. Two sets of stationary breaker fingers shown at 106 and 107 are mounted in proximity to the bottom of the casing 104 and adjacent the rearward end thereof. These sets of stationary fingers are directed toward one another and consist in a plurality of spaced individual fingers as will be seen from Fig. 7. Rotatably journalled in the casing 104 on a shaft 108, is a rotating breaker roll 109. On this roll 109 there are two sets of spirally arranged breaker fingers or lugs 110. These fingers or lugs are equally spaced along the length of the roll 109, and interposed between the stationary fingers 106 and 107, as also clearly shown in Fig. 7 taken together with Fig. 6 of the drawings.

Figure 6:
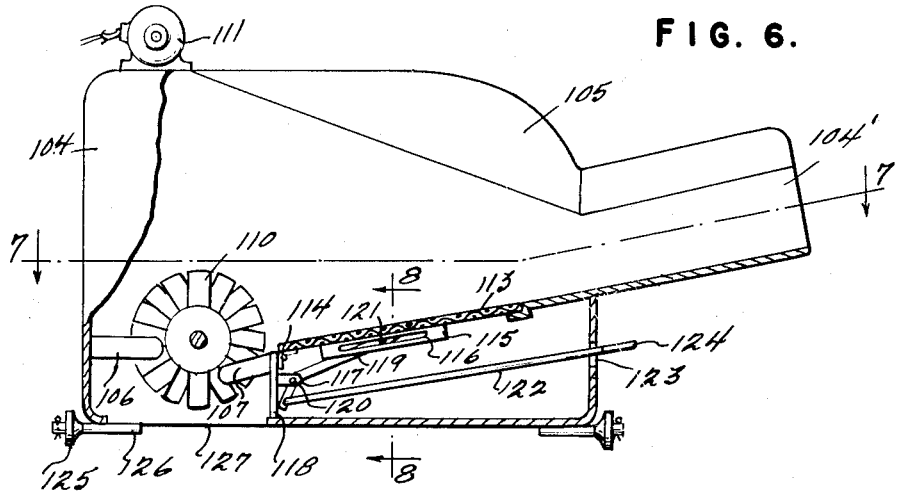
Figure 6 is a sectional view taken on the line 6—6 of Figure 1, showing details of the breaker mechanism.

A motor 111 is mounted on the casing as shown in Fig. 6. A pulley 112 is mounted on an end of shaft 108. By means of a belt extending between the motor 111 and the pulley 112, the roll 109 can be rotated at any desired speed. When the roll rotates, the fingers 110 will intermesh with the fingers 106 and 107. The various fingers are so spaced in relation to one another that when the spiral rotating fingers or lugs 110 engage with the stationary lugs 106 and 107 individual vegetables will be parted from the mass form they assumed during freezing but because of the proper spacing of the fingers any breaking of individual vegetable particles is eliminated.

Provision is also made in the present invention to insure that vegetables placed on the chute 104' will reach the fingers so as to be separated. This is accomplished by a bottom grate 113 forming a portion of the bottom of the breaker assembly. This grate is hinged at 114 so that it is capable of being raised to a substantially upright position. A plate 115 is carried by the grate 113 and has an elongated slot 116 therein. A bracket 117 is mounted on the upstanding wall 118. The bracket 117 pivotally mounts a bell crank lever 119 at pivot point 120. A stud 121 on one end of lever 119 is slidably held in slot 116. On the opposite end of lever 119 a push pull rod 122 is pivotally mounted. The push pull rod 122 extends through an opening 123 in the face of casing 104 and has a handle 124 thereon. If a frozen mass of vegetables have been placed in the chute 104' and fail to reach the breaker fingers, then by an outward pull on handle 124 the bell crank lever through rod 122 will raise the grate 113 by coaction between the slot 116 and stud 119 upon pivoting of the bell crank lever. When this occurs the grate will be raised to an upright position and the material on the grate will be fed to the fingers 106, 107 and 110 so that the breaking action can take place.

A set of predetermined diameter drive sprockets for the various metering screws permits varying the speed ratio of the screws. Varying the speed ratio will result in changing the proportions of the individual ingredients in the final mix. These sprockets can be easily slipped on or off the various shafts when a change is desired and the machine is temporarily stopped. The total output of the machine can of course be varied at any time even during operation.

As set forth hereinbefore, an object of the present invention is to provide a mixing of vegetables of different kinds. In order to fill the individual hoppers with the different kinds of vegetables it is necessary that the breaker unit be movable so that it can be placed over any of the individual hoppers 12 to 17 inclusive. Provision is accordingly made for moving the breaker unit to a position directly over any of the individual hoppers. This is effected by means of wheels 125 rotatably mounted on shafts 126 secured to the casing 104 in any desired manner. The inner edges of the wheels 125 are beveled for coaction with the rounded upper edge 18 of the group of hoppers or a bar which may be placed along the longitudinal length of the group. When it is desired to feed a vegetable into any given hopper, the breaker is rolled to the desired position and a vegetable to be placed in this hopper is introduced into the breaker unit. When set in operation, the vegetable after being parted in the breaker unit will feed through the opening 127 in the bottom of the breaker unit and fall directly into the selected hopper.

Manifestly changes in details of construction will be apparent to those skilled in the art to which the invention pertains without departing from the scope of the invention as defined in the appended claims.

I claim:

1. A material metering and mixing machine comprising hoppers, a breaker selectively coacting with, and dischargeable into said hoppers, metering and feeding means coacting with said hoppers for continuously volumetrically measuring and withdrawing material from said hoppers and mixing means for the withdrawn material, said breaker including a casing, two spaced rows of stationary spaced fingers in said casing, a rotatable roll mounted intermediate of said rows of stationary fingers, a plurality of spaced fingers on said roll forming rotatable spaced spirally arranged rows of fingers thereon, said rotatable fingers being interspaced with said stationary fingers, said stationary fingers and said rotatable fingers being adapted for coaction to break material therebetween, an entrance chute into said casing, a grate interposed between said chute and said rows of fingers, said grate forming a base portion of said casing, said grate being pivotally mounted and movable to upright position for facilitating movement of material to said fingers, a bracket mounted on said casing, a bell-crank lever pivoted intermediate its ends on said bracket, a slotted plate on the bottom of said grate, a handle connected with one end of said bell-crank lever, a stud on the opposite end of said bell-crank lever operatively slidable in the slot of said plate, movement of said handle being adapted for pivoting said bell-crank lever and thereby pivoting said grate about its pivot point for raising the same.

2. A metering and mixing machine for frozen vegetables comprising a plurality of aligned separate hoppers forming a group of contiguous hoppers, said hoppers being adapted for receiving individual specifically different vegetables for proportioning and mixing of the vegetables, feed means for selectively introducing different vegetables into separate said hoppers, said feed means including pre-breaking means movable along and over said group of aligned hoppers for initially breaking up a frozen mass of a vegetable and discharging the vegetable into a separate one of said hoppers, the upper edge of the group of said hoppers being substantially continuous and constituting a runway, a casing for said feed means, wheels rotatably mounted on said casing, said wheels engaging said upper edge and being movable therealong for selective positioning of the breaker, metering and feeding means coacting with each said hopper for continuously withdrawing and proportioning vegetables from said hoppers, and mixing means collectively coacting with all said metering and feeding means for mixing said metered vegetables.

3. A metering and mixing machine as claimed in claim 2, a chute opening into said casing, a plurality of spaced, stationary fingers mounted in said casing, a plurality of spaced rotatable fingers inter-engaging with said spaced fingers and adapted for coacting therewith to pre-break the frozen mass of a vegetable therebetween.

4. A metering and mixing machine as claimed in claim 3, said metering and feeding means coacting with said hoppers comprising casings, mounted below each individual said hopper, and open thereto, a screw conveyer rotatably mounted in each said casing and adapted for receiving vegetables discharged from said hopper and volumetrically measuring the vegetables from said hopper.

5. A metering and mixing machine as claimed in claim 4, said mixing means comprising a casing positioned below all said hoppers and common thereto, the individual metering screws discharging into said casing, a screw conveyor rotatably mounted in said casing, said screw conveyor in said casing continuously mixing and discharging vegetables combined from said individual hoppers.

6. In a metering and mixing machine, a material hopper group consisting of a plurality of aligned hoppers, material metering and feeding means coacting with each said hopper for continuously withdrawing and proportioning material therefrom, mixing means collectively coacting with all said metering and feeding means for mixing discharged materials, common drive means for all said metering and feeding means and said mixing means, adjustable means for varying the output rate of said machine, said common drive means including a motor movably mounted on said machine, a reduction gear on said machine, drive means between said motor and said reduction gear, two output shafts on said reduction gear, drive means interconnecting one said output shaft and the individual metering and feeding means, and means interconnecting the other said output shaft and the mixing means for said materials, movement of said motor being adapted for changing the speed of said reduction gear and accordingly the output speed of said individual metering and feeding means and said mixing means.

References Cited in the file of this patent

UNITED STATES PATENTS

| | | |
|---|---|---|
| 202,337 | Duvall | Apr. 16, 1878 |
| 433,777 | Emerson et al. | Aug. 5, 1890 |
| 1,215,739 | Stehli | Feb. 13, 1917 |
| 1,794,181 | Kosten | Feb. 24, 1931 |
| 1,941,808 | McConnaughay | Jan. 2, 1934 |
| 2,081,552 | Myers | May 25, 1937 |
| 2,136,214 | Keith | Nov. 8, 1938 |

FOREIGN PATENTS

| | | |
|---|---|---|
| 607,378 | France | July 1, 1926 |
| 218,026 | Great Britain | July 3, 1924 |